(12) United States Patent
Bremer et al.

(10) Patent No.: US 10,358,075 B2
(45) Date of Patent: Jul. 23, 2019

(54) PARTICULATE MATERIAL TRAILER HOPPER DOOR OPENING APPARATUS

(71) Applicant: Sioux City Tarp, Inc., Sioux City, IA (US)

(72) Inventors: Donald W. Bremer, Sioux City, IA (US); Terry L. Berg, Sioux City, IA (US)

(73) Assignee: Sioux City Tarp, Inc., Sioux City, IA (US)

(*) Notice: Subject to any disclaimer, the term of this patent is extended or adjusted under 35 U.S.C. 154(b) by 335 days.

(21) Appl. No.: 15/352,685

(22) Filed: Nov. 16, 2016

(65) Prior Publication Data

US 2017/0136933 A1 May 18, 2017

Related U.S. Application Data

(60) Provisional application No. 62/255,557, filed on Nov. 16, 2015.

(51) Int. Cl.
| | |
|---|---|
| *B60P 1/56* | (2006.01) |
| *E05F 15/652* | (2015.01) |
| *E05F 15/657* | (2015.01) |
| *E05F 15/659* | (2015.01) |

(52) U.S. Cl.
CPC ............ *B60P 1/56* (2013.01); *E05F 15/652* (2015.01); *E05F 15/657* (2015.01); *E05F 15/659* (2015.01); *E05Y 2900/516* (2013.01)

(58) Field of Classification Search
CPC .......................................................... B60P 1/56
USPC .............................................. 298/24, 27, 28
See application file for complete search history.

(56) References Cited

U.S. PATENT DOCUMENTS

| | | | | |
|---|---|---|---|---|
| 3,536,013 | A * | 10/1970 | Nagy | B61D 7/20 |
| | | | | 105/282.3 |
| 3,865,046 | A * | 2/1975 | Fuller | B60P 1/56 |
| | | | | 105/253 |
| 2006/0156947 | A1* | 7/2006 | Heider | B60P 1/56 |
| | | | | 105/250 |
| 2010/0270848 | A1* | 10/2010 | Heider | B60P 1/56 |
| | | | | 298/27 |
| 2015/0115688 | A1* | 4/2015 | Goedken | B60P 1/56 |
| | | | | 298/27 |

* cited by examiner

*Primary Examiner* — Hilary L Gutman
(74) *Attorney, Agent, or Firm* — McKee, Voorhees & Sease, PLC

(57) ABSTRACT

A hopper door opening and closing apparatus operates a door on a hopper discharge opening. A pair of motorized linear actuators, each having an extendable rod, are mounted to support rails on opposite sides of the door. A bracket connects the rods to the door. A controller selectively activates the linear actuators to extend the rods and thereby move the door to an open position that permits material to flow through the lower opening and selectively activates the linear actuators to retract rods and thereby move the door to a closed position covering the lower opening.

6 Claims, 6 Drawing Sheets

US 10,358,075 B2

PARTICULATE MATERIAL TRAILER HOPPER DOOR OPENING APPARATUS

CROSS-REFERENCE TO RELATED APPLICATIONS

This is a conversion of U.S. Provisional Application Ser. No. 62/255,557, filed Nov. 16, 2015, of which is herein incorporated by reference in its entirety.

FIELD OF THE INVENTION

This invention relates generally to mechanisms for opening a hopper door on a trailer, and more particularly, to automated mechanisms for opening the hopper door for a particulate material trailer.

BACKGROUND OF THE INVENTION

A hopper trailer is a trailer that includes one or more hoppers defined within the trailer body. Each of the hoppers includes a discharge opening through which grain, or other loose granular material may flow in order to empty the trailer. The discharge opening at the lower end of the hopper is typically provided with a door that can be selectively opened and closed by a user to permit flow through the discharge opening or to prevent flow through the discharge opening. In a conventional design, the door slides in a generally horizontal plane to open and close the discharge opening.

One disadvantage of the conventional sliding door design is that it is difficult to move the door when the trailer is fully loaded with grain or other bulk materials. According to a conventional design a hand crank is provided to allow a user to move the sliding door back and forth between the open and closed positions. However, it can be difficult and inconvenient to manually provide the necessary force to move the sliding door.

Automated designs powered by hydraulics have been proposed. However, these hydraulic designs have some disadvantages. They require significant hardware and expertise to connect to a hydraulic system. They can be noisy during operation, and require pressure to be maintained in the hydraulic lines even when not in operation. There is a need for an improved automated design that does not utilize hydraulics.

Accordingly, a primary objective of the present invention is the provision of an improved door opening and closing apparatus for a particulate material trailer hopper door.

Another objective of the present invention is the provision of a motorized linear actuator connected to a door of a particulate material container to control opening and closing of the door.

A further objective of the present invention is the provision of a method of moving a granular material hopper door between open and closed positions.

Yet another objective of the present invention is the provision of a method and means for remotely operating a door of a grain trailer discharge chute.

Still another objective of the present invention is the provision of an apparatus for quickly, easily and safely opening and closing a discharge door of a particulate material container.

These and other objectives will become apparent from the following description of the invention.

SUMMARY OF THE INVENTION

According to one embodiment, the present invention relates to a hopper door opening and closing apparatus for opening and closing a door located at a lower opening of a granular or particulate material hopper. A pair of support rails are mounted to opposite sides of the hopper. A pair of linear actuators each having an electric motor electrically connected to a power source and each having an extendable and retractable actuator rod are mounted to the support rails. A bracket is operably attached to the door and has a central portion with end portions extending from the central portion. The end portions include vertically extending portions that extend from the central portion to a height above a top edge of the rails The end portions also include lateral portions that extent outward beyond outer faces of the rails, and tabs that the attach the lateral portions to the rods, such that the bracket connects the rods to the door. A controller selectively activates the linear actuators to extend the rods and thereby move the door to an open position that permits material to flow through the lower opening, and selectively activates the linear actuators to retract the rods and thereby move the door to a closed position covering the lower opening. The apparatus may include a remote control, wherein the linear actuators are controllable with the remote control. Motor guards may be mounted to the support rails to protect the motors.

The invention also encompasses a method of operating the door of a discharge chute on a particulate material hopper. The method involves actuating a motor to extend and retract a linear actuator connected to the door so as to move the door between open and closed positions. The method may be conducted remotely using a remote control device.

DETAILED DESCRIPTION OF THE PREFERRED EMBODIMENTS

Figure 1:
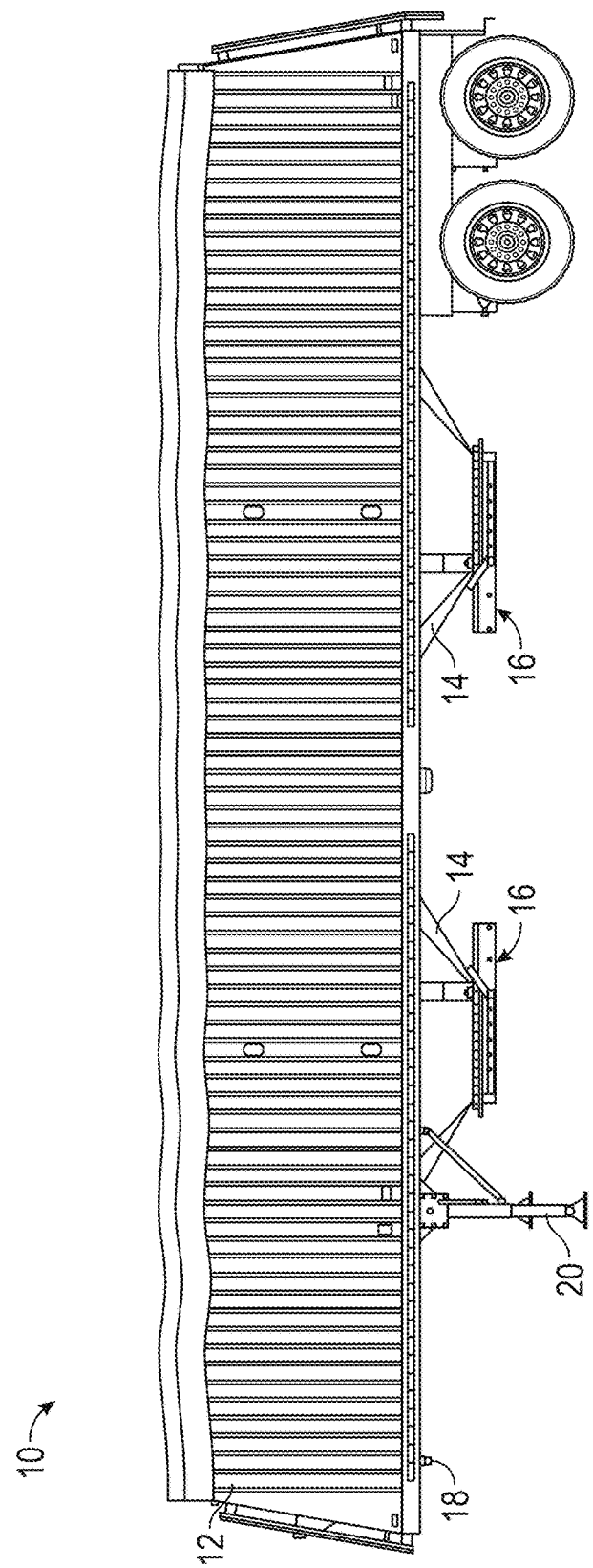
FIG. 1 is side elevation view of a truck trailer with an open top, and having a cover tarp and two discharge chutes and openings, and with the door opener of the present invention.
Figure 2:
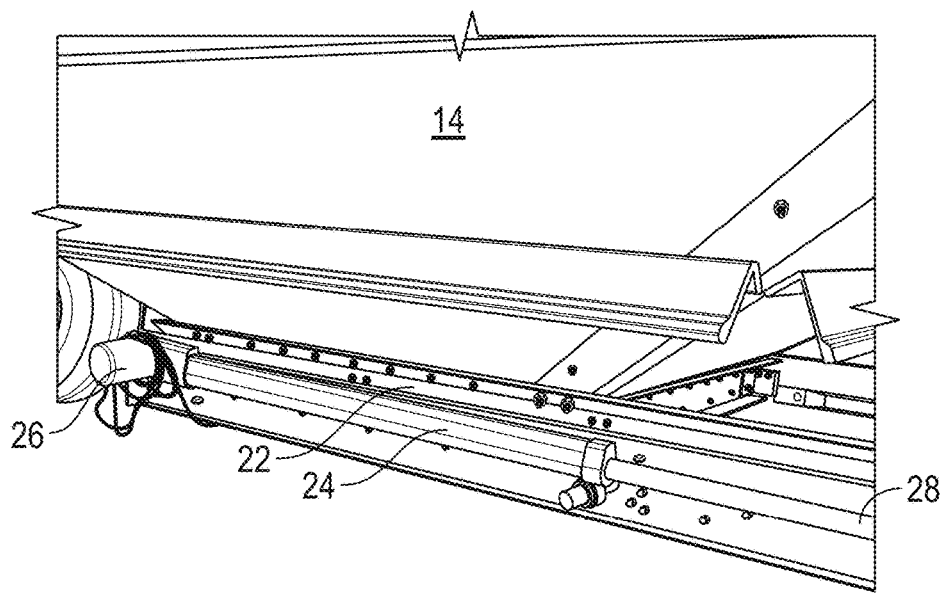
FIG. 2 is a close up view of a hopper door opening and closing apparatus according to one embodiment of the present invention, with the actuator extended to open the hopper door.
Figure 3:
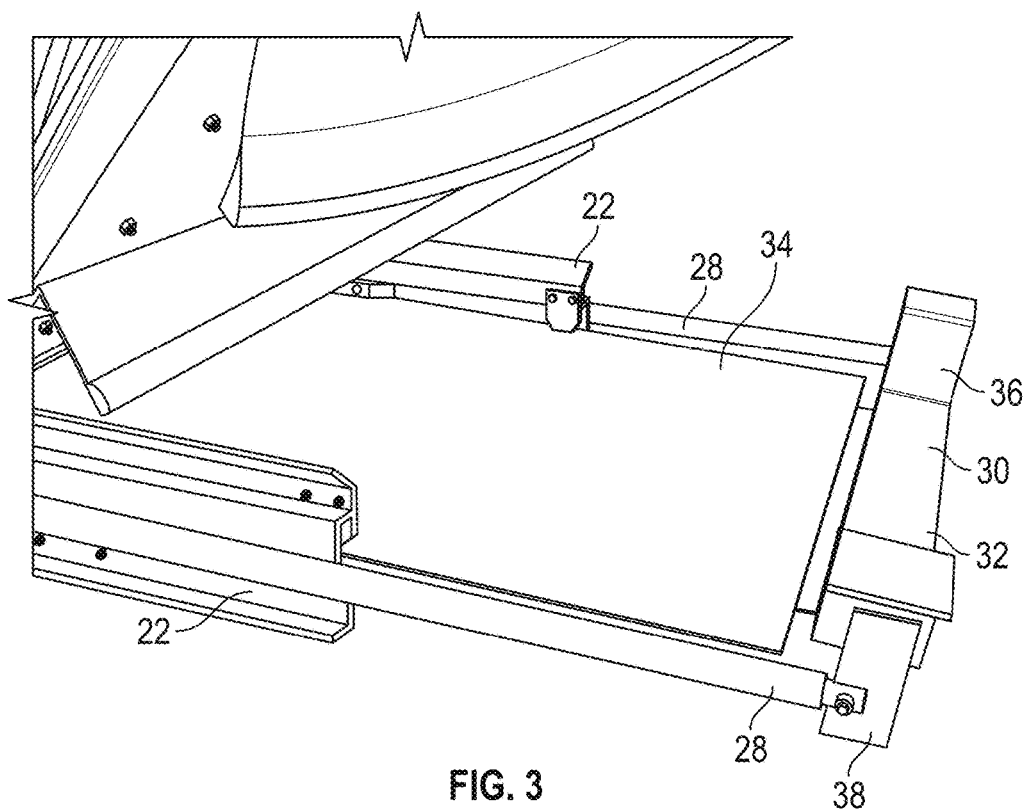
FIG. 3 is another close up view of the hopper door opening and closing apparatus of the present invention, with the door in an open position.
Figure 4:
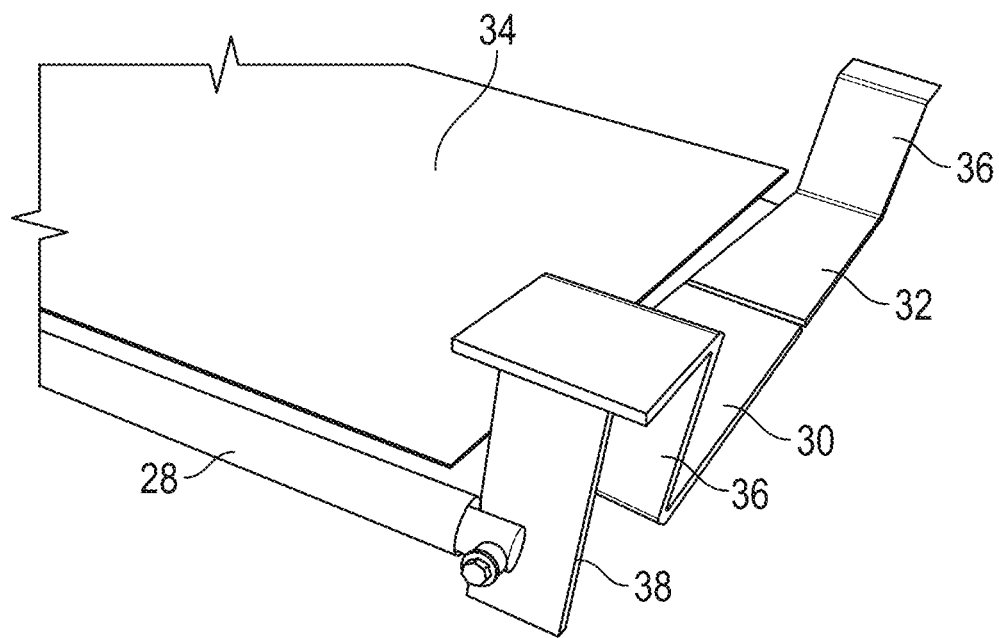
FIG. 4 is an enlarged view of the bracket of the apparatus.
Figure 5:
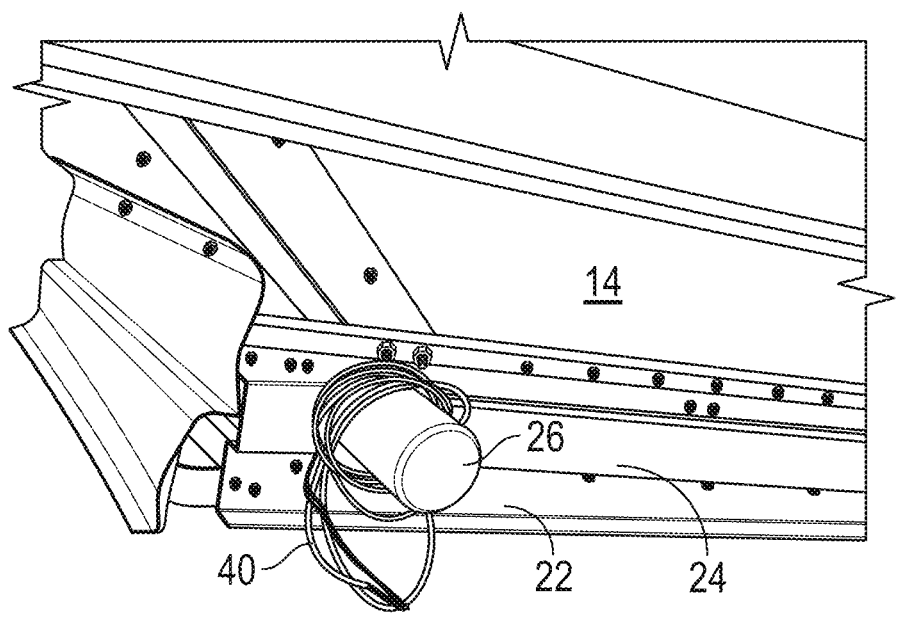
FIG. 5 is another enlarged view of the electric motor of the door opener and closer apparatus.
Figure 6:
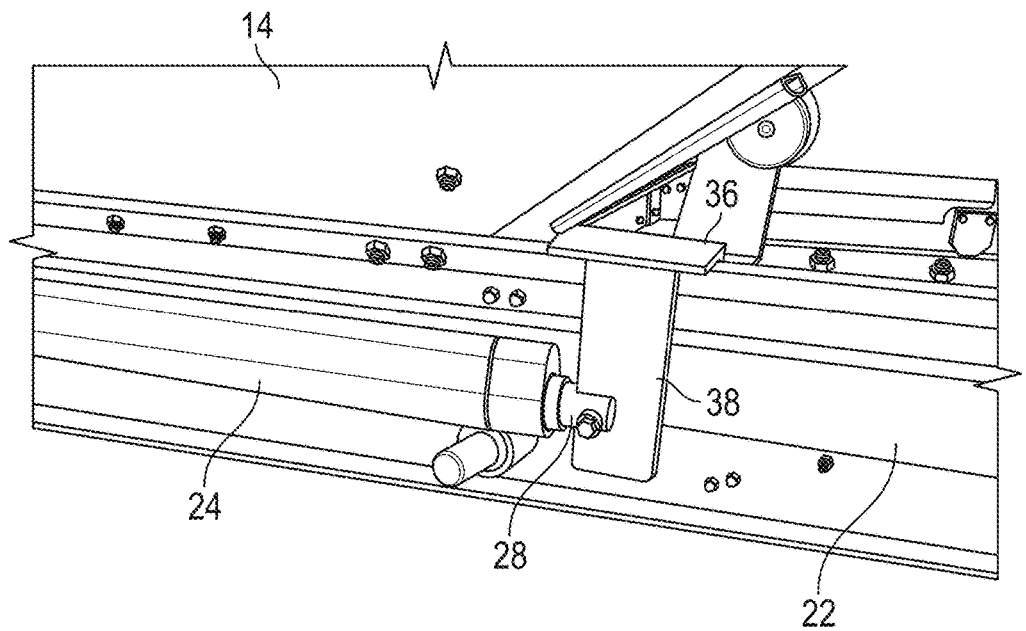
FIG. 6 is a perspective view of the hopper door opening and closing apparatus, with the actuator in a retracted position to close the door.

FIG. 1 shows a hopper trailer 10 including a storage compartment 12 that is suited for containing grain, coal, fertilizer, gravel, sand, or other loose, solid, flowable particulate or granular material. The lower portion of the storage compartment 12 is provided with hopper chutes 14. The hopper chutes 14 act as funnels to guide the flow of granular material (not shown) within the storage compartment 12 through discharge openings (not shown) at the lower ends of the hopper chutes 14. The hopper trailer 10 of FIG. 1 includes a kingpin structure 18 that is adapted to be connected to the fifth wheel of a truck (not shown) or other towing vehicle. Collapsible and foldable jacks 20 are provided to support the hopper trailer 10 when it is not connected to a towing vehicle.

The present invention is directed toward a hopper door opening and closing apparatus 16 provided on each of the hopper chutes 14. The hopper door opening and closing apparatus 16 provides a mechanism for controlling the flow of the granular material through the discharge openings.

Additional details of the hopper door opening and closing apparatus 16 can be seen in FIGS. 2-6. A pair of support rails 22 are mounted at a lower portion of each chute 14 on opposite lateral sides of the chute 14. One of the rails 22 is mounted on the driver side of the chute 14 and the other is mounted on the passenger side. The rails 22 are elongated metal beams that act as mounting and support structures for linear actuators 24. The rails 22 may be attached to the chutes by bolts, rivets, or the like. In many instances the rails 22 will be existing structure used to support the sliding hopper door 34.

Electric motors 26 are provided at one end of each of the linear actuators to selectively extend and retract corresponding output rods or arms 28. The free ends of the two output rods 28 are attached to a bracket 30 that extends between and connects the free ends of the two output rods 28. The bracket 30 includes a lower central portion 32 that attaches to the hopper door 34 and end portions 36 that connect the central portion 32 with the output rods 28. The end portions 36 extend vertically upward from the lower central portion 32, laterally outward beyond the width of the support rails 22 and, and vertically downward to connect with the free ends of the output rods 28. The end portions 36 attach to the rods 28 preferably by an easily detachable connector, such as a bolt. In the embodiment shown, the lower central portion 32 along with the adjacent vertical and lateral portions are formed from a single piece of metal bent to the desired shape, and separate metal tabs 38 are welded to that piece of metal to act as the connection to the rods 28 (See FIG. 4).

The linear actuators 24 may be screw-type electric linear actuators. According to a preferred embodiment, the linear actuators 24 have in input voltage of 12V DC such that they can be powered by a standard vehicle battery when the trailer 10 is attached to a towing vehicle. A wire harness 40 may be attached to each linear actuator 24 to connect with the electrical system of the towing vehicle, or other electrical power source. According to a preferred embodiment, the linear actuators 24 may include a 12A motor and have a sixty (60) inch stroke. A linear actuator sold under the brand/model Progressive Automations PA-04 has been found to be suitable. The linear actuators 24 are preferably controllable with a remote control, such as an RF or Bluetooth controller. The linear actuators 24 may be provided with a smart controller that permits actuation through a mobile device application. The linear actuators 24 may include limit switches to stop the rods 28 in the fully open and fully closed positions. Alternatively, a user may stop the linear actuators 24 with the door in any desired position from fully opened to fully closed, or anywhere in between, using the remote controller, or other activator. Additionally, the controller may be programmable to stop the door 34 at pre-programmed or learned intermediate positions. As a still further option, the controller may be programmed to open the door 34 to a desired position and automatically move it back to a closed position after a set period of time to facilitate unloading a desired amount of material through the hopper.

Figure 9:
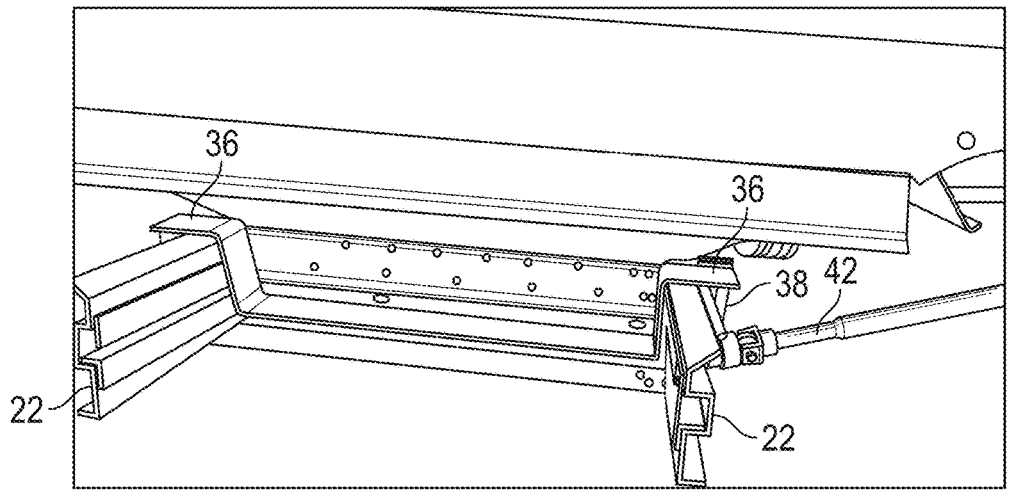
FIG. 9 is another perspective view of the hopper door opening and closing apparatus of FIG. 7.
Figure 10:
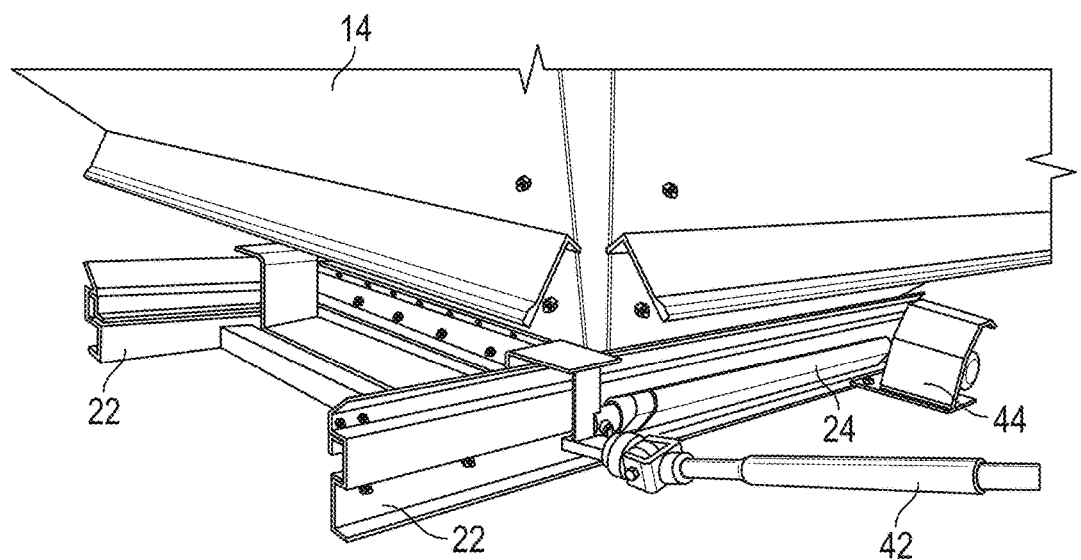
FIG. 10 is a right side perspective view of the door opening and closing apparatus shown in FIG. 7.

The opening and closing apparatus 16 will operate without the need to disconnect the existing rack and pinion manual opening and closing systems 42 (see FIG. 9) on most trailers. However, in case the opening and closing apparatus 16 is not functioning, or there is no available electrical source, the rods 28 may be quickly and easily detached from the bracket 30, so that the actuator 24 does not preclude or prevent manual movement of the door 34.

Figure 7:
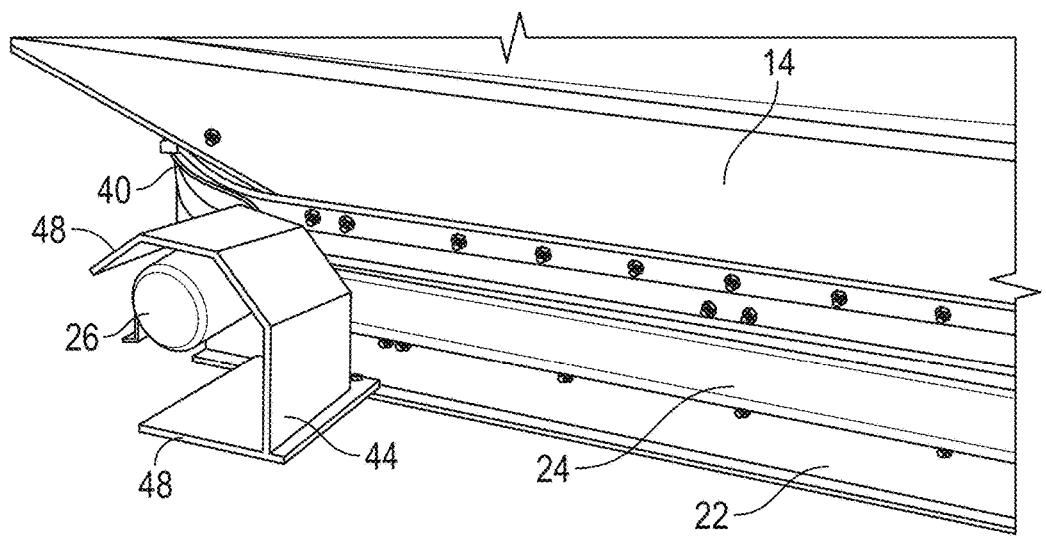
FIG. 7 is a perspective view of an alternative embodiment of a hopper door opening and closing apparatus that includes a motor guard.
Figure 8:
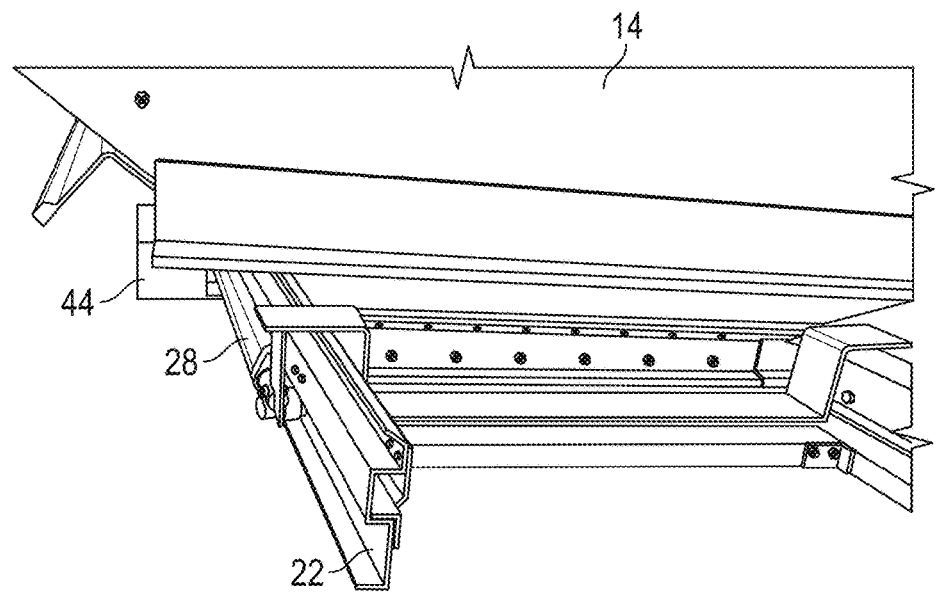
FIG. 8 is a left side perspective view of the hopper door opening and closing apparatus of FIG. 7.

FIGS. 7-10 show an alternative embodiment of the opening and closing apparatus 16 that also includes a motor guard 44. The motor guard 44 may be formed of any appropriate material, such as from metal plates that are welded together, to form a shield that protects the motor 26, especially during times when the trailer 10 is being transported. As best seen in FIG. 7, the guard 44 may include a lower plate 46 that is bolted or otherwise secured to the rail 22 below the motor 26, and a cover 48 that is welded to the plate 46 to protect the motor 26, especially against contact that might occur during movement of the trailer 10, and from weather and debris.

The opening and closing apparatus 16 improves upon existing hydraulic door options. The linear actuators 24 are smaller, simpler to install, and permits more accurate control of the door position. Unlike a hydraulic system, the linear actuators 24 do not require power input to hold their position. The actuators are also quieter and better for the environment.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A hopper door opening and closing apparatus for opening and closing a door located at a lower opening of a hopper, the apparatus comprising:
   a first support rail mounted to a first side of the hopper;
   a second support rail mounted to a second side of the hopper opposite from the first side of the hopper;
   an electric power source;
   a first linear actuator mounted to the first support rail, the first linear actuator having a first motor electrically connected to the power source and a first actuator rod;
   a second linear actuator mounted to the second support rail, the second linear actuator having a second motor electrically connected to the power source and a second actuator rod;
   a bracket, the bracket including a central portion operably attached to the door and having a first end portion extending from a first end of the central portion and a second end portion extending from a second end of the central portion opposite from the first end of the central portion, the end portions including vertically extending portions that extend from the central portion to a height above a top edge of the rails, lateral portions extending outwardly beyond the rails, and tabs attaching the lateral portions to the rods, such that the bracket connects the rods to the door; and
   a controller for selectively activating the linear actuators to extend the rods and thereby move the door to an open position that permits material to flow through the lower opening, and for selectively activating the linear actuators to retract rods and thereby move the door to a closed position covering the lower opening.

2. The apparatus of claim 1, further comprising a remote control, and wherein the linear actuators are controllable with the remote control.

3. The apparatus of claim 1, further comprising a first motor guard mounted to the first rail, the first motor guard protecting the first motor; and a second motor guard mounted to the second rail, the second motor guard protecting the second motor.

4. The apparatus of claim 3, wherein, the first motor guard includes a first lower plate that is secured to the first rail below the first motor, and a first cover that is secured to the first lower plate to protect the motor against contact that might occur during movement and from weather and debris.

5. The apparatus of claim 1, wherein the apparatus is adapted to be retrofit on a hopper that includes a rack and pinion manual opening and closing system, and further wherein the apparatus is adapted to open and close the door without the need to disconnect the rack and pinion manual opening and closing system.

6. The apparatus of claim 5, wherein the apparatus is adapted such that when the apparatus is not functioning, or there is no available electrical source, the rods may be quickly and easily detached from the brackets, so that the actuators do not impede manual movement of the door by the rack and pinion manual opening and closing system.

* * * * *